US010412419B2

(12) United States Patent
Kim et al.

(10) Patent No.: US 10,412,419 B2
(45) Date of Patent: Sep. 10, 2019

(54) ADAPTIVE FILTERING IN VIDEO CODING

(71) Applicant: QUALCOMM Incorporated, San Diego, CA (US)

(72) Inventors: Woo-Shik Kim, San Diego, CA (US); Joel Sole Rojals, La Jolla, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 123 days.

(21) Appl. No.: 14/328,545

(22) Filed: Jul. 10, 2014

(65) Prior Publication Data

US 2015/0016550 A1    Jan. 15, 2015

Related U.S. Application Data

(60) Provisional application No. 61/845,508, filed on Jul. 12, 2013, provisional application No. 61/846,586, filed on Jul. 15, 2013.

(51) Int. Cl.
| | |
|---|---|
| *H04N 7/12* | (2006.01) |
| *H04N 11/02* | (2006.01) |
| *H04N 11/04* | (2006.01) |
| *H04N 19/80* | (2014.01) |
| *H04N 19/70* | (2014.01) |

(Continued)

(52) U.S. Cl.
CPC .......... *H04N 19/80* (2014.11); *H04N 19/117* (2014.11); *H04N 19/136* (2014.11); *H04N 19/186* (2014.11); *H04N 19/70* (2014.11); *H04N 19/82* (2014.11); *H04N 19/86* (2014.11)

(58) Field of Classification Search
CPC ........ H04N 19/80; H04N 9/70; H04N 19/117; H04N 19/86; H04N 19/186; H04N 19/82; H04N 19/136
See application file for complete search history.

(56) References Cited

U.S. PATENT DOCUMENTS

| 7,535,961 B2 | 5/2009 | Cho et al. |
|---|---|---|
| 9,729,879 B2 * | 8/2017 | An ....................... H04N 19/176 |

(Continued)

FOREIGN PATENT DOCUMENTS

| CN | 1578477 A | 2/2005 |
|---|---|---|
| EP | 1507415 A2 | 2/2005 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Jeremiah C Hallenbeck-Huber
*Assistant Examiner* — Boubacar Abdou Tchoussou
(74) *Attorney, Agent, or Firm* — Schumaker & Sieffert, P.A.

(57) ABSTRACT

Performing deblock filtering on video data may include determining, for a first non-luma color component of the video data, whether to perform deblock filtering based on a first deblock filtering process or a second deblock filtering process. Next, deblock filtering may be performed on the first non-luma color component in accordance with the determined deblock filtering process.

23 Claims, 10 Drawing Sheets

(51) Int. Cl.
*H04N 19/117* (2014.01)
*H04N 19/136* (2014.01)
*H04N 19/186* (2014.01)
*H04N 19/82* (2014.01)
*H04N 19/86* (2014.01)

(56) References Cited

U.S. PATENT DOCUMENTS

| | | | |
|---|---|---|---|
| 2003/0206587 | A1 | 11/2003 | Gomila et al. |
| 2005/0013363 | A1 | 1/2005 | Cho et al. |
| 2011/0222607 | A1* | 9/2011 | An .................. H04N 19/159 375/240.24 |
| 2011/0274158 | A1* | 11/2011 | Fu .................. H04N 19/00006 375/240.02 |
| 2013/0259118 | A1* | 10/2013 | Fu .................. H04N 19/00066 375/240.02 |
| 2013/0266061 | A1* | 10/2013 | An .................. H04N 19/176 375/240.02 |
| 2014/0078394 | A1* | 3/2014 | Lou .................. H04N 11/20 348/453 |
| 2014/0169478 | A1* | 6/2014 | Guo .................. H04N 19/00909 375/240.16 |
| 2014/0355667 | A1* | 12/2014 | Lei .................. H04N 19/105 375/240.02 |
| 2015/0365666 | A1* | 12/2015 | Dong .................. H04N 19/117 375/240.12 |

FOREIGN PATENT DOCUMENTS

| | | |
|---|---|---|
| EP | 1659803 A1 | 5/2006 |
| EP | 1500197 A4 | 1/2011 |
| JP | 2005039842 A | 2/2005 |
| JP | 2009538086 A | 10/2009 |
| WO | 03094497 A2 | 11/2003 |
| WO | 2008060127 A1 | 5/2008 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

An et al., "CE12 Subtest 1: Improved Deblocking Filter," 20110309. No. JCTVC-E079, Mar. 16-23, 2011, XP030008585, 8 pp.

Kim et al., "AhG5: Deblocking Filter in 4:4:4 Chroma Format," Qualcomm Inc, JCT-VC Meeting; Jul. 25-Aug. 2, 2013; Vienna, AT; (Joint Collaborative Team on Video Coding of ITU-T SG.16 WP 3 and ISO/IEC JTC 1/SC 29/WG 11); URL:http://wftp3.itu.int/av-arch/jctvc-site/,No. JCTVC-N0263, 4 pp.

International Search Report and Written Opinion from International Application No. PCT/US2014/046301, dated Jan. 26, 2015, 12 pp.

Response to Written Opinion dated Jan. 26, 2015, from International Application No. PCT/US2014/046301, filed on May 12, 2015, 10 pp.

Second Written Opinion from International Application No. PCT/US2014/046301, dated Aug. 17, 2015, 6 pp.

Response to Second Written Opinion dated Aug. 17, 2015, from International Application No. PCT/US2014/046301, filed on Sep. 25, 2015, 13 pp.

International Preliminary Report on Patentability dated Nov. 17, 2015, from International Application No. PCT/US2014/046301 15 pp.

* cited by examiner

4:2:0 sample format

4:2:2 sample format

4:4:4 sample format

ADAPTIVE FILTERING IN VIDEO CODING

This application claims the benefit of U.S. provisional application No. 61/845,508 filed on Jul. 12, 2013, and U.S. provisional application No. 61/846,586 filed on Jul. 15, 2013, the entire content of each of which is incorporated by reference herein.

TECHNICAL FIELD

This disclosure relates to video coding, and more particularly to techniques for filtering video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to filtering in a video coding process. For example, aspects of this disclosure generally relate to providing a format-adaptive filtering scheme for applying a deblocking filter in video coding. The techniques of this disclosure include enabling variable deblocking filtering (e.g., enabling or disabling strong deblocking filtering) for chroma components based on the color space of the video data being coded.

In one example, a method for performing deblock filtering on video data comprises determining, for a first non-luma color component of the video data, whether to perform deblock filtering based on a first deblock filtering process or a second deblock filtering process, and performing deblock filtering on the first non-luma color component in accordance with the determined deblock filtering process.

In another example, an apparatus for performing deblock filtering on video data comprises a memory that is configured to store the video data; and, at least one processor that is configured to: determine, for a first non-luma color component of the video data, whether to perform deblock filtering based on a first deblock filtering process or a second deblock filtering process, and perform deblock filtering on the first non-luma color component in accordance with the determined deblock filtering process.

In another example, a tangible, non-transitory processor-readable storage medium stores instructions, which, when executed, cause one or more processors to: determine, for a first non-luma color component of the video data, whether to perform deblock filtering based on a first deblock filtering process or a second deblock filtering process, and perform deblock filtering on the first non-luma color component in accordance with the determined deblock filtering process.

In another example, a method for deblock filtering on video data, the method comprises: determining, for a first non-luma color component of the video data, whether to perform deblock filtering based on a first deblock filtering process or a second deblock filtering process, and coding a syntax element to indicate the determined deblock filtering process for the first non-luma color component The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
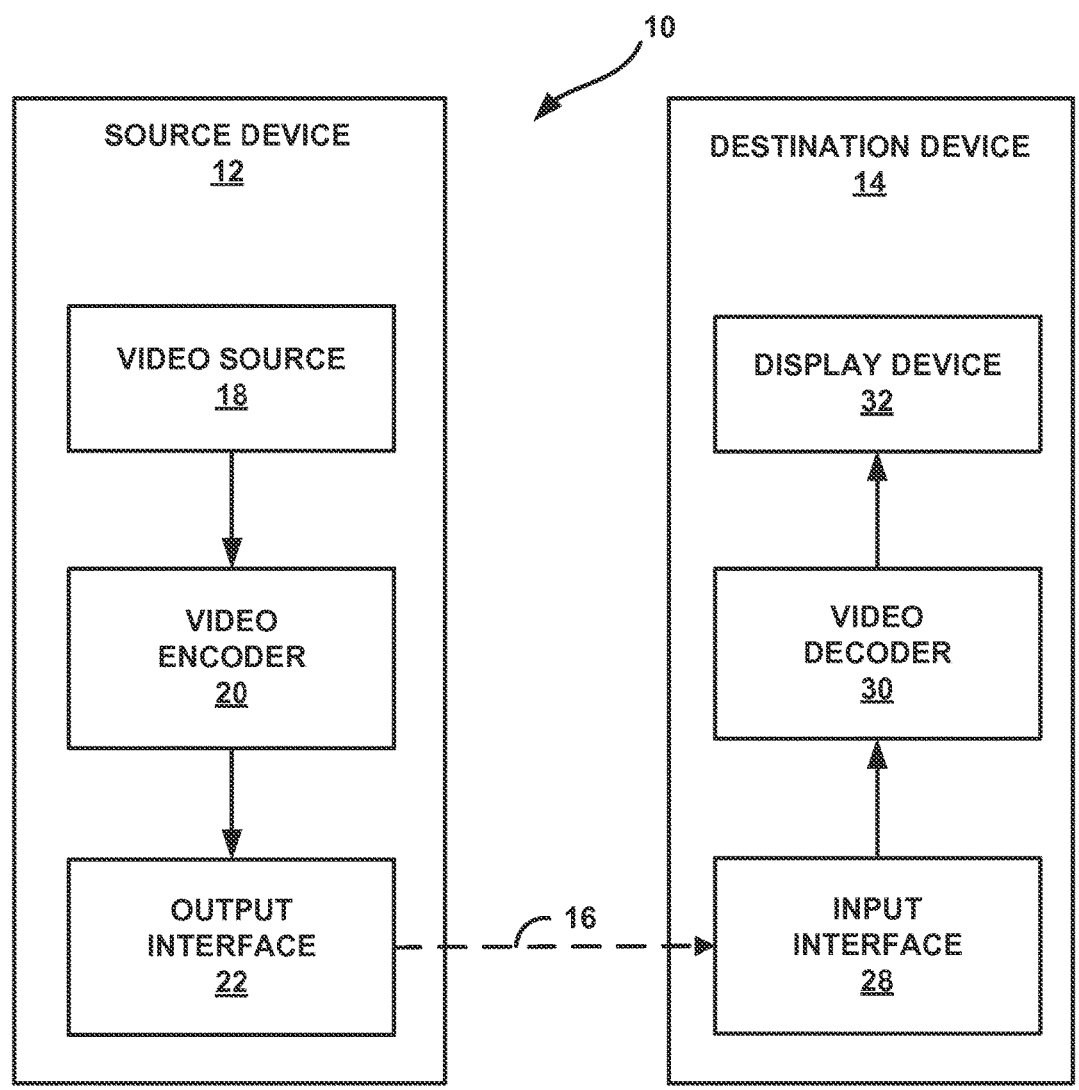
FIG. 1 is a block diagram illustrating an example video encoding and decoding system that may implement the techniques of this disclosure.

Aspects of this disclosure generally relate to video coding and compression. In some examples, the techniques may be related to a High Efficiency Video Coding (HEVC) Range Extension, in which color spaces other than YCbCr 4:2:0 may be supported.

Aspects of this disclosure may relate to a method, apparatus, and manufacture for performing deblock filtering on video data that may include determining, for a first non-luma color component of the video data, whether to perform deblock filtering based on a first deblock filtering process or a second deblock filtering process. Next, deblock filtering may be performed on the first non-luma color component in accordance with the determined deblock filtering process.

Video data can be present in various color spaces, such as YCbCr and RGB. Video data includes components, also referred to as color components—for example, Y, Cb, and Cr are each components of YCbCr video data; and R, G, and B are each components of RGB video data. For video data in the YCbCr color space, Y is a luma component and Cb and Cr are chroma components. The term non-luma component is used herein to describe any component of video data that is not a luma component. Accordingly, for video data in the YCbCr color space, Y is a luma component, and Cb and Cr are non-luma components. For video data in the RBG color space, R, G, and B are all non-luma components.

HEVC is a video coding standard that was recently developed by the Joint Collaborative Team on Video Coding (JCT-VC) of ITU-T WP3/16 and ISO/IEC JTC 1/SC 29/WG 11. The Range Extension of HEVC includes extending video coding for color spaces other than YCbCr 4:2:0, such as YCbCr 4:2:2, YCbCr 4:4:4, and RGB.

For example, the luma and chroma components of pixels in a coding unit (CU) or transform unit (TU) may be coded in different sub-sampling formats. In an example, the luma and chroma components of a pixel may be coded in a 4:2:0 format. In a 4:2:0 pixel format, for every 2×2 block of pixels, there are four luma components and 2 chroma components (e.g., 1 Cr chroma component and 1 Cb chroma component). As such, in a 2×2 block of pixels, the chroma components are sampled at ½ horizontal resolution and ½ vertical resolution. In a 4:2:2 pixel format, for every 2×2 block of pixels, there are four luma components and 4 chroma components (e.g., 2 Cr chroma components and 2 Cb chroma components). As such, for a 4:2:2 format, the chroma components are sampled at one-half (½) horizontal resolution and full vertical resolution. The 4:4:4 pixel format involves no sub-sampling of chroma components. That is, with the 4:4:4 format, for a 2×2 block of pixels, there are four luma components, four Cr components, and four Cb components. In an RGB format, with the 4:4:4 format, the number of red samples, the number of green samples, and the number of blue samples are typically equal.

Certain video coding techniques may result in a reconstruction error during reconstruction of a video signal. In some instances, filtering may be applied in a video coding process to compensate for the reconstruction error. For example, sharp edges can occur between blocks when block coding techniques are used. To address blocking artifacts such as sharp edges not present in the original video signal, a video coder (a video encoder and/or a video decoder) may perform pixel edge filtering operations to smooth the block edges.

The filtering operations are typically specified by filter parameters such as boundary strengths and edge thresholds associated with the block edges. The term "edge threshold" refers to a threshold of edge sharpness. For example, deblocking filtering may be either applied or not applied at a particular block boundary of reconstructed video based on how sharp the edges are at the boundary. The greater the edge threshold, the sharper the edge at the block boundary of the reconstructed video must be in order for the edge to be filtered.

The term "boundary strength" is explained in greater detail below. "Boundary strength" is a non-negative integer value that is a property of a block boundary of reconstructed video, in which block edges that are more likely to have blocking artifacts are assigned a greater value for the boundary strength.

The filter parameters can change dynamically from one pixel edge to the next pixel edge and from one video coding standard to another. As such, a video coder calculates the boundary strengths and edge thresholds of the block edges prior to performing the actual filtering operation. These boundary strength and edge threshold calculations may take place in the same pipeline stage as the filtering operations of a video coding process (referred to as "in loop") or in a stage prior to the filtering operations.

After generating the boundary strengths, the video coder may perform the actual pixel filtering. Some deblocking implementations may use hardwired control logic to transfer the relevant pixels from external and/or internal storage elements (relative to the video coder), select the correct deblocking parameters, and store the deblocked pixels back into external and/or internal storage elements.

In any case, in HEVC Version 1, H.265: High efficiency video coding (Apr. 13, 2013) (the first version of the finalized HEVC standard), in-loop deblocking filtering is applied to the reconstructed signal after dequantization and inverse transform. The term "in-loop" deblocking filtering is well known in the art and refers to deblocking filtering that is performed within either or both of the encoding path and the decoding path. The deblocked, filtered signal is stored as a reference frame for inter prediction. For the YCbCr 4:2:0 format, as noted above, more information exists in the Y component as compared to the Cb component or the Cr component, and Cb and Cr components are downsampled with respect to the Y component. Due to a difference in characteristics between that of the Y component and that of either the Cb component or the Cr component, a different deblocking filtering scheme is applied for the Y component relative to the deblocking filter scheme applied to either the Cb component or Cr component.

In HEVC, two filters are defined for the Y component, including a strong filter and a weak filter (which may also be respectively referred to as a strong deblocking mode and a weak deblocking mode). A strong filter is used for strong deblocking and a weak filter is used for weak deblocking.

With either weak deblock filtering or strong deblock filtering, edge pixels of a video block may be filtered with respect to edge pixels of an adjacent video block such that the transitions between adjacent video blocks are more difficult for a viewer to perceive. For example, in accordance with either weak deblock filtering or strong deblocking filtering, filtering may be performed by adjusting the values of edge pixels to make them more similar to values of nearby pixels (e.g., including adjacent pixels) in order to "smooth" the boundaries between adjacent video blocks. With strong filtering, the edge pixel values are more strongly based on the values of nearby pixels than weak filtering, for example by using a greater averaging factor. In various examples, factors other than having the edge pixel values more strongly based on the values of nearby pixels may be employed to cause a filter to be stronger.

For example, a strong filter typically considers more lines of video data than the number of lines of video data considered by a weak filter and/or may have a longer filter tap size than that of a weak filter. In HEVC Version 1, only a weak filter is applied to Cb and Cr components, because the Cb and Cr components have less energy compared to the Y component.

For example, in accordance with HEVC Version 1, for luma components there is a strong deblocking filter and a weak deblocking filter. The strong deblocking filter for luma components modifies three pixels on each side of the edge being filtered to make the boundary smooth. The weak filter for luma components modifies only two pixels on each side of edge being filtered. For this reason, the strong deblocking filter for luma components makes the filtered boundary less smooth than the weak deblocking filter. The deblocking filter for non-luma components in accordance with HEVC Version 1 modifies only one pixel on each side of edge. Accordingly, in accordance with HEVC Version 1, the deblocking filter is weaker than the weak deblocking filter for luma components.

Filter strength is a trade-off, as follows. The stronger the deblock filtering applied is, the better the block artifact removal will be. However, as the strength of a filter is increased, the sharpness of the reconstructed image, as perceived by the viewer, may begin to lessen.

In HEVC Version 1, the deblocking filtering process for luma components of video data is different from the deblocking filtering process for non-luma components in several ways. In some examples according to aspects of this disclosure, a determination is made as to whether the deblocking filtering process for non-luma components of video data should apply one or more aspects of the deblocking filtering processes that are only used for luma components in HEVC Version 1.

In various examples, this determination may be made based on one or more factors that are discussed in greater detail below. In one specific example, a value of a flag, "deblock_chroma_as_luma", may be set to 1 if one or more aspects of the deblocking filtering processes that are only used for luma components in accordance HEVC Version 1 should, in accordance with the present disclosure, be applied to one or more non-luma components. In other words, in various examples, based on the value of the "deblock_chroma_as_luma" flag being set to 1, deblock filtering of one or more of the non-luma components is performed in the same way as (i.e., identical to) the deblocking filtering of the luma components in HEVC Version 1. In some instances, the value of the "deblock_chroma_as_luma" flag being set to 1 results in an indication that strong filtering may be applied to non-luma components.

Furthermore, in accordance with the present disclosure, the value of the deblock_chroma_as_luma flag is set to 0 if deblocking filtering for one or more non-luma components should be performed as specified in HEVC Version 1. In other words, in some examples, based on the value of the "deblock_chroma_as_luma" flag being set to 0, deblock filtering of the non-luma components is performed in a conventional manner in accordance with HEVC Version 1 such that, for example, a strong filter is not allowed for deblock filtering of the non-luma components.

In one specific example, the value of the flag may be set to either 0 or 1 depending on the color space of the video data. In other examples, other factors may be used in determining whether one or more aspects of the deblocking filtering process utilized only for luma components in accordance with HEVC Version 1 should be applied to one or more non-luma components, as discussed in greater detail below. Also, the one or more aspects of the deblocking filtering process that are only used for luma components in accordance with HEVC Version 1 that may be applied, in accordance with the present disclosure, to non-luma components when the value of the deblock_chroma_as_luma flag is set to 1 are discussed in greater detail below.

In accordance with HEVC Version 1, for luma components, a determination is made for each block as to whether to apply no filter, a weak filter, or a strong filter. This determination may be based on, for example, the edge characteristics of the respective blocks. The luma strong filter has a greater filtering strength than the luma weak filter as discussed above. Also, in accordance with HEVC Version 1, for non-luma components, for each block, a determination is made as to whether to apply no filter or a weak filter. This determination may be based on, for example, the edge characteristics of the respective blocks within the non-luma components. In accordance with HEVC Version 1, strong filtering is never performed for non-luma components. Further, in accordance with HEVC Version 1, the "weak" filtering that may be performed for non-luma components is weaker in filtering strength than the "weak" filtering that is performed for luma components in accordance with HEVC Version 1.

Applying only a weak filter for chroma components may harm the visual quality for color spaces other than YCbCr 4:2:0 such as RGB or YCbCr 4:4:4, because chroma components in various other color spaces may have more energy than the energy associated with the chroma components in the above-described YCbCr 4:2:0 format.

Some aspects of this disclosure generally relate to providing a format-adaptive filtering scheme. For example, the techniques of this disclosure include, for example, enabling variable (i.e., adaptive based on one or more factors) deblocking filtering for chroma components based on at least a color space of video data being coded. As described herein, the term "color space" generally refers to color components (e.g., RGB, YCbCr, or the like) and/or a sampling rate of each component that forms the video data. As used herein, the term "color space" refers to not just color components but also refers to the associated sampling format of the color components, so that, for example, the color spaces YCbCr 4:4:4 and YCbCr 4:2:0 are considered to be different color spaces. A color space may also be referred to as a video format, or, more simply, a format.

In some examples, to improve the visual quality achieved as a result of deblock filtering, strong filtering is allowed for (i.e., may be applied to) chroma components or for all color components (e.g., R, G, and B in case of the RGB color space).

As discussed above, an indication such as a flag, "deblock_chroma_as_luma," may be signaled to indicate whether or not one or more aspects of the deblocking filtering processes that are only used for luma components in accordance with HEVC Version 1 should be applied to non-luma components. One of the aspects of the deblocking filtering process that is only used for luma components in accordance with is strong filtering. Strong filtering cannot be applied to non-luma components in accordance with HEVC Version 1. In some examples operating in accordance with this disclosure, when the deblock_chroma_as_luma flag has a value of 1, strong filtering can be applied to all color components of the reconstructed signal. In other examples according to the present disclosure, when the deblock_chroma_as_luma flag has a value of 1, strong filtering is not enabled for non-luma components of the reconstructed signal, but other aspects of the deblocking filtering processes that are only used for luma components in accordance with HEVC Version 1 are applied to the deblocking filtering of non-luma components of the reconstructed video, as discussed in greater detail below.

For example, an indication such as a flag, "deblock_chroma_as_luma," may be signaled by a video encoder to indicate whether or not strong filtering can be applied to all color components of a reconstructed signal. If a value of the flag is set to "0", the deblock filtering is performed in accordance with HEVC Version 1. If the value of the flag is set to "1", the deblock filtering defined for luma in HEVC Version 1 is further applied to all the color components of the reconstructed signal. An example of this process is discussed in greater detail below.

The value of the above-described flag may be set at the discretion of a user of the video coder. For example, for RGB sequences, the deblock_chroma_as_luma flag can be set to a value of 1, and for YCbCr 4:4:4 sequences, this flag can be set to a value of 0 if a user does not want the video coder to apply strong filtering to the chroma components.

In an example, the flag can be signaled, by the video encoder, at a sequence level as part of a sequence parameter set (SPS). In this example, a sequence parameter set (SPS) or another sequence-level parameter set generated by a video encoder may include a flag (e.g., the deblock_chroma_as_luma flag) to indicate whether or not strong filtering can be applied to all color components of a reconstructed signal.

In another example, the flag can be signaled by the video encoder at a picture level as part of a picture parameter set (PPS). In another example, the flag can be signaled by the video encoder at a slice level as part of a slice header. In each case, the video decoder receives the signaling generated by the video encoder in the encoded bitstream.

In some examples, as discussed above, an indication, for example the deblock_chroma_as_luma flag, may be used indicate whether or not one or more aspects of the deblocking filtering process that are only used for luma components in accordance with HEVC Version 1 should, in accordance with the present disclosure, be applied to non-luma components. In these examples, the value of the flag is set prior to deblocking filtering, and the deblocking filtering process may apply one or more aspects of the deblocking filtering process that are only used for luma components in accordance with HEVC Version 1 to non-luma components based on the value of the flag. In other examples, no such flag is present (i.e., no such flag is coded or signaled), and the determination as to whether or not one or more aspects of the deblocking filtering processes that are only used for luma components in accordance with HEVC Version 1 should, in accordance with the present disclosure, be applied to non-luma components may be made during the deblocking filtering process itself. In these examples, the determination (as to whether or not to apply one or more aspects of deblocking filtering for luma components in HEVC Version 1 to one or more non-luma components) is made based on one or more factors discussed within the present disclosure rather than being based on the value of a flag.

According to aspects of this disclosure, in some examples, the determination (as to whether or not to apply one or more aspects of deblocking filtering for luma components in HEVC Version 1 to one or more non-luma components) may be made based on a profile of the video data being coded. A "profile" corresponds to a subset of algorithms, features, and/or tools and well as any constraints that apply to the algorithms, features, and/or tools. More specifically, a "profile" is a subset of the entire bitstream syntax that is specified by the video coding standard. "Tiers" and "levels" may be specified within each profile. A "level" corresponds to the consumption limitations of the decoder's resources. Examples of the decoder's resources include the decoder's memory and the decoder's computation ability, which affect the resolution of the pictures, bit rate, and block processing rate.

A profile has a profile indicator, e.g., "profile_idc", where high profile 4:4:4 and screen content 4:4:4 profile are examples of two types of profiles that may be indicated by a respective value of the profile_idc. Similarly, a level may be signaled with a value of a level indicator (e.g., "level_idc". A level of a tier may be a specified set of constraints imposed on values of the syntax elements in the bitstream. These constraints may be simple limits on values. Alternatively, the specified set of constraints may take the form of constraints on arithmetic combinations of values (e.g., picture width multiplied by picture height multiplied by number of pictures decoded per second). A level specified for a lower tier is more constrained than a level specified for a higher tier.

In some examples, if the profile of the video data is a high profile 4:4:4, then the determination is made to apply one or more aspects of deblocking filtering for luma components in HEVC Version 1 to one or more non-luma components of the video data. In some of these examples, if the profile of the video data is a screen content 4:4:4 profile, then the determination is made to perform deblocking filtering for one or more non-luma components as specified for non-luma components in HEVC Version 1.

In another example, different deblocking filtering can be applied depending on a chroma format of the video data. In the Range Extension to HEVC, a chroma format may be signaled to indicate whether the signal is in 4:4:4, 4:2:2, or 4:2:0. In this example, if the format is in 4:4:4, the deblocking filtering defined for luma in HEVC Version 1 is applied for all color components. If the format is in 4:2:2, 4:2:0, or 4:0:0, the deblocking filtering for one or more non-luma components is performed in accordance with HEVC Version 1.

In still another example, the filtering applied to luma components in accordance with HEVC Version 1 may be applied to non-luma components with the exception of strong deblocking filtering. For example, in accordance with HEVC Version 1, for non-luma components (not for luma components), a block boundary is filtered only when either of the blocks or both of the blocks forming this boundary is/are coded with an intra-prediction mode. Accordingly, one of the one or more aspects of deblocking filtering for luma components in accordance with HEVC Version 1 that may applied to one or more non-luma components of the video data when the determination is made to apply one or more aspects of deblocking filtering for luma components in accordance with HEVC Version 1 to one or more non-luma components of the video data, is that deblocking filtering may be performed for non-luma components of the video data even for boundaries in which neither of the blocks forming the boundary are coded with an intra-prediction mode.

In the above example, the basis for refraining from applying a strong filter to non-luma components is that a strong filter may require more implementation resources, because a strong filter typically requires storing more lines of pixels due to a longer filter tap size relative to a weak filter. Therefore, to reduce implementation complexity, all aspects of deblocking filtering that apply to luma components in accordance with HEVC Version 1 may be applied to non-luma components, with the exception of the strong filtering used for luma components in accordance with HEVC Version 1. That is, in accordance with various examples of the present disclosure, when the determination is made to apply one or more aspects of the deblocking filtering process that are only used for luma components in HEVC Version 1 to non-luma components, all aspects of the deblocking filtering process specified for luma components in HEVC Version 1 may be applied for non-luma components except that strong filtering is not allowed for non-luma components.

In still another example, different thresholds, $\beta$ and $t_C$, may be used according to the above-described flag or chroma format. For example, in HEVC, thresholds, $\beta$ and $t_C$ are defined to control deblocking strength. That is, the greater the values of $\beta$ and $t_C$ are, the greater the deblocking strength, and vice versa. A precise definition of $\beta$ and $t_C$ is given in the HEVC specification. The A table (8-11) is defined in HEVC containing these thresholds values according to QP, as shown below:

TABLE 8-11

Derivation of threshold variables $\beta'$ and $t_C'$ from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| $\beta'$ | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| $\beta'$ | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | | | |
| $\beta'$ | 38 | 40 | 42 | 44 | 46 | 48 | 50 | 52 | 54 | 56 | 58 | 60 | 62 | 64 | — | — | | | |
| $t_C'$ | 5 | 5 | 6 | 6 | 7 | 8 | 9 | 10 | 11 | 13 | 14 | 16 | 18 | 20 | 22 | 24 | | | |

The table provides values for the variables $\beta'\beta$ and $t_C'$. The variables $\beta$ and $t_C$ can be derived from variables $\beta'$ and $t_C'$ as follows.

$$\beta=\beta'*(1<<(BitDepth_Y-8))$$

$$t_C=t_C'*(1<<(BitDepth_Y-8))$$

According to aspects of this disclosure, an additional table may be defined so that strong filtering can be applied for chroma components. In this example, if the determination has been made to apply one or more aspects of the deblocking filtering processes that are only used for luma components in HEVC Version 1 to non-luma components, this new table is used so that strong filtering is enabled for non-luma components.

In HEVC Version 1, deblocking filtering cannot be applied to non-luma components of the video data for inter-coded blocks, but deblocking filtering can be applied to luma components of inter-coded blocks.

Figure 10:
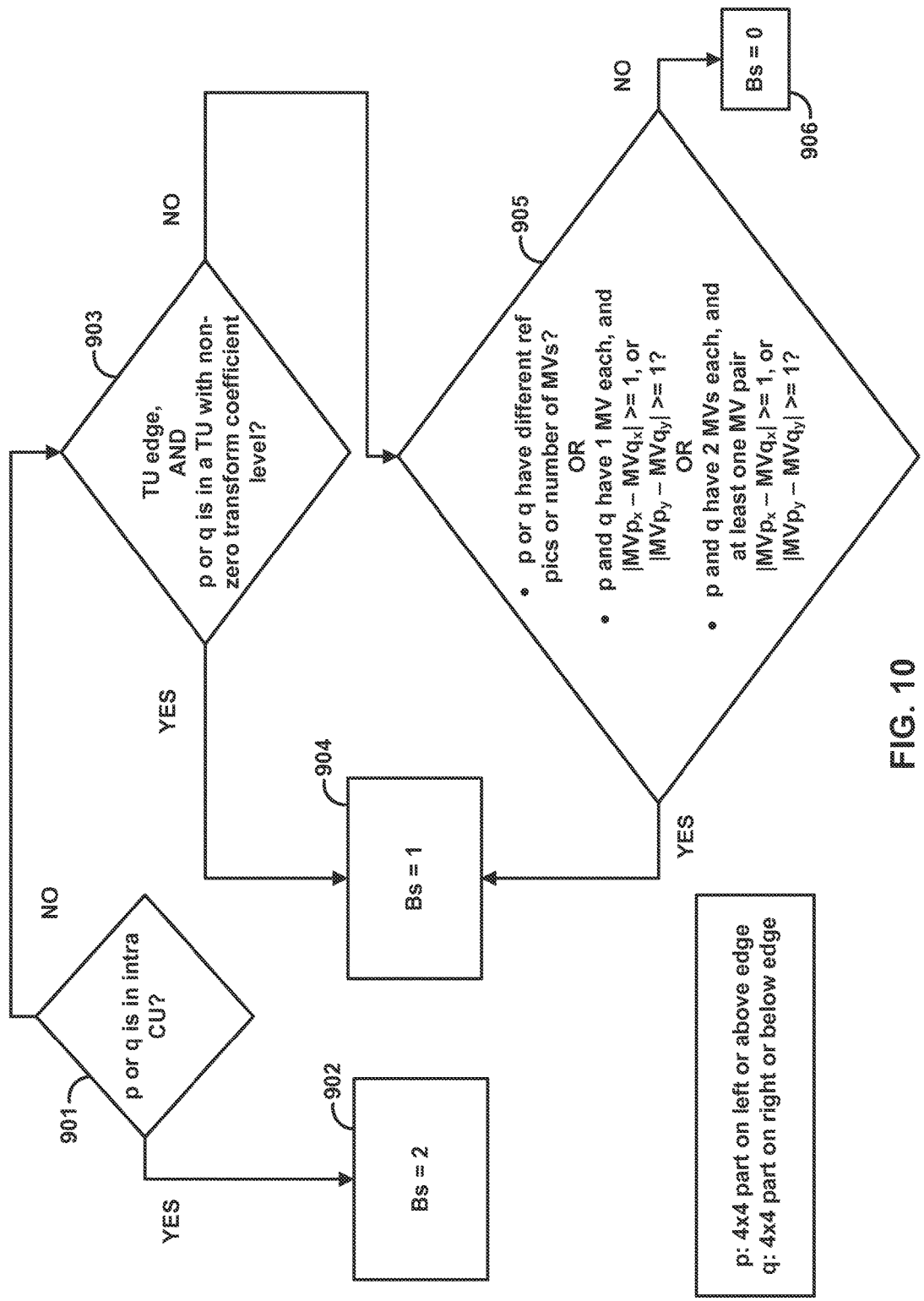
FIG. 10 is a flow diagram illustrating a technique for calculating a boundary strength consistent with HEVC and the techniques of this disclosure.

In some examples, the techniques of this disclosure may apply the chroma deblocking filtering to inter-coded blocks. In the current specification for HEVC, the chroma filter is applied when the boundary strength is equal to "2", which indicates that one of the blocks forming the boundary is intra-coded. In accordance with this disclosure, the chroma filtering may further be applied when the boundary strength of a boundary is larger than "0" (which allows deblocking filtering to be performed for inter-coded blocks among the non-luma components). In some examples, the boundary strength for the non-luma components can be calculated in the same way that the boundary strength is calculated for the luma component. Or, in some examples, the same boundary strength that is calculated for the luma component can be applied for the chroma component. FIG. 10, as described in greater detail below, is a flow diagram that illustrates how the boundary strength may be calculated in compliance with HEVC, consistent with the techniques of this disclosure.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing filtering in video coding may be performed by any digital video encoding and/or decoding device. Although generally the techniques of this disclosure are performed by a video encoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or tangible storage media, such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples. Through the specification and the claims, the term "tangible processor-readable storage medium" and/or "non-transitory processor-readable medium" is specifically defined to exclude propagating signals per se, but the term "tangible processor-readable storage medium" and/or "non-transitory processor-readable medium" does include random access memory (RAM), register memory, processor cache, and the like.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable non-transitory processor-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

In some instances, video encoder 20 and/or video decoder 30 may perform one or more filtering processes on the video data during coding, e.g., to compensate for errors introduced by the coding process. For example, video encoder 20 and/or video decoder 30 may perform pixel edge filtering operations to smooth the block edges, which may be referred to as deblocking filtering.

As noted above, some aspects of this disclosure generally relate to providing a format-adaptive filtering scheme. For example, the techniques of this disclosure include enabling variable deblocking filtering (e.g., weak deblocking or strong deblocking) for chroma components based on the color space of the video data being coded.

According to aspects of this disclosure, video encoder 20 and/or video decoder 30 may enable application of strong filtering to non-luma components, which may be a subset of color components (e.g., Cr, Cb in case of YCbCr color space) or all color components for some color spaces (e.g., R, G, and B in case of RGB space). In some examples, video encoder 20 signals a flag (e.g., deblock_chroma_as_luma), which may be decoded by video encoder 20 and/or video decoder 30 to indicate whether one or more aspects of deblocking filtering for luma components in HEVC Version 1 should be applied to one or more non-luma components of the video data. In some instances, the "deblock_chroma_as_luma" flag being set to 1 results in an indication that strong filtering may be applied to one or more non-luma components.

In some examples, video encoder 20 signals a flag prior to any deblocking filtering being performed, and deblocking filtering is performed during both the encoding loop and the decoding loop. During both the encoding loop and the decoding loop, the flag is decoded during deblocking filtering. If video encoder 20 sets the value of the flag to 0, video encoder 20 and video decoder 30 may perform deblocking filtering according to the scheme described in HEVC Version 1.

For example, according to the scheme described in HEVC Version 1, luma components may be deblocked using either a strong or weak deblocking filter (depending, for example, on edge characteristics of the blocks being deblocked), while chroma components may be deblocked using only a weak deblocking filter. If video encoder 20 sets the value of the flag is 1, the flag indicates that deblocking filtering specified in HEVC Version 1 for luma components is applied to one or more non-luma components.

In this case, responsive to the flag, video encoder 20 and video decoder 30 may apply the deblocking filtering according to HEVC Version 1 for luma components to all color components. In other words, the same deblocking filtering scheme specified for luma components by HEVC Version 1 also may be applied to chroma components when the flag is set to 1. (As discussed in greater detail below, in some examples, some aspects of the deblocking filtering scheme specified for luma component by the HEVC Version 1 are applied to non-luma components and some are not.) For example, when the value of the flag is set to 1, both luma and chroma color components (or all RBG components) may be deblocked using either a strong or weak deblocking filter (depending, for example, on edge characteristics of the luma or chroma blocks (as applicable) being deblocked).

In some examples, the flag may be set differently for different color spaces. For example, video encoder 20 may set the value of the flag to 1 for RGB sequences and for YCbCr 4:4:4 sequences. In this case, with the flag set to 1, video encoder 20 and/or video decoder 30 may use some or all of deblocking filtering scheme specified for luma components by HEVC Version 1 for all components of both RGB sequences and YCbCr 4:4:4 sequences. (In another example, video encoder 20 may set the flag to 0 for RGB sequences and for YCbCr 4:4:4 sequences, indicating that deblocking filtering for the color components are performed in accordance with HEVC Version 1.)

For other sequences, such as YCbCr 4:2:2 and 4:2:0 sequences, video encoder 20 may set the value of the flag to 0. In this case, with the value of the flag set to 0, video encoder 20 and/or video decoder 30 perform deblocking filtering for the color components in accordance with HEVC Version 1 for both YCbCr 4:2:2 and 4:2:0 sequences. These examples and others are explained in greater detail below.

Video encoder 20 may signal the flag at the sequence level as part of a sequence parameter set (SPS). In another example, video encoder 20 may signal the flag at the picture level as part of a picture parameter set (PPS). In another example, video encoder 20 may signal the flag at the slice level as part of a slice header.

In some examples, video decoder 30 makes the determination (as to whether or not to apply one or more aspects the deblocking filtering applied to luma components in HEVC Version 1 to one or more non-luma components) using a profile of the video data being coded. According to aspects of this disclosure, in one example, if the profile of the video data being coded is a high profile 4:4:4, video decoder 30 may make the determination to apply one or more aspects of the deblocking filtering applied to luma components in HEVC Version 1 to one or more non-luma components. Alternatively, if the profile of the video data being coded is a screen content 4:4:4 profile, video decoder 30 may perform deblocking filtering for components of the video in accordance with HEVC Version 1.

In another example, video encoder 20 and/or video decoder 30 may apply different deblocking filtering based on the chroma format of the video data being coded. For example, when using the Range Extension to HEVC, video encoder 20 may signal a chroma format to indicate whether the video data being coded is 4:4:4, 4:2:2, or 4:2:0 YCbCr color space. According to aspects of this disclosure, if the 4:4:4 color space is signaled and used, video decoder 30 may perform deblocking filtering as defined for luma components in HEVC Version 1 for all color components. For example, video decoder 30 may determine whether to use strong deblocking filtering or weak deblocking filtering for each component (Y, Cb, and Cr) in the manner that HEVC Version 1 specifies for the Y component. For other color spaces, video decoder 30 may perform deblocking filtering in the same way as is performed in HEVC Version 1.

In some examples, when the flag is set to 1, all aspects of deblocking filtering that are specified for the luma component in HEVC Version 1 are applied to all components of the video. However, in other examples, when the flag is set to 1, some aspects of deblocking filtering that are specified for the luma component in HEVC Version 1 are applied to non-luma components and some are not. For example, in some examples, when the flag is set to 1, strong deblocking filtering is not enabled for non-luma components, but all other aspects of deblocking filtering that are specified for the luma component in HEVC Version 1 are applied to one or more non-luma components.

Accordingly, in some examples, video encoder 20 and/or video decoder 30 may apply the luma deblocking process to chroma components, but may refrain from applying the strong deblocking filter of the luma deblocking process to chroma components. For example, in HEVC Version 1, deblocking filtering for chroma components may be prediction dependent. That is, in HEVC Version 1, video encoder 20 and/or video decoder 30 may only perform deblocking filtering on non-luma components when one or both blocks forming the boundary being deblocked have been coded using an intra-prediction mode (as described in greater detail, for example, with respect to FIGS. 2 and 3 below).

According to aspects of this disclosure, in some instances, this deblocking prediction restriction for chroma components (i.e., performing deblocking on chroma components only when one or both blocks forming the boundary being deblocked have been coded using an intra-prediction mode) may be removed. Thus, in this example, if the luma filtering process is applied to chroma components, inter-coded chroma block boundaries may be filtered along with the inter-coded luma blocks. As discussed above, when the flag is set to 1, some or all aspects of deblocking filtering that are specified for luma components in HEVC Version 1 are applied to non-luma components. One of the aspects of deblocking filtering that are specified for luma components in HEVC Version 1 and which is applied to non-luma components when the flag is set to 1 is allowing inter-coded block boundaries to be filtered.

Applying a strong deblocking filter may require more implementation resources, because the strong filter typically requires storing more lines of pixels due to a longer filter tap size. Therefore, to reduce implementation complexity, according to some examples, while video encoder 20 and/or video decoder 30 may apply the luma deblocking filtering process to both luma and chroma components (e.g., regardless of the prediction mode), video encoder 20 and/or video decoder 30 may refrain from performing the strong deblocking filtering on the chroma components. In other examples, however, video encoder 20 and/or video decoder 30 may perform the strong deblocking filtering for both luma and chroma components.

As discussed above, when the flag is set to 1, some or all aspects of deblocking filtering that are specified for luma components in HEVC Version 1 are applied to non-luma components. One aspect of deblocking filtering that are specified for luma components in HEVC Version 1 is that strong filtering is enabled for luma components. Another aspect of deblocking filtering that is specified for luma components in HEVC Version 1 is that filtering of inter-coded block boundaries is enabled. Another aspect of the deblocking filtering that is specified for the luma component in HEVC Version 1 is that the weak filtering for luma components is stronger than the weak filtering for non-luma components. In various examples, when the flag is set to 1, one, some, or all of these aspects may be enabled for non-luma components of the video.

In some examples, video encoder 20 may signal whether to apply luma deblocking filtering to chroma components using one or more syntax elements similar to the flag described above. That is, video encoder 20 may set a flag to 0 when luma deblocking filtering is not applied to chroma components (indicating that deblocking filtering is applied to all components in accordance with HEVC version 1) and the flag to 1 when luma deblocking filtering is applied to chroma components (indicating that some or all of the aspects of deblocking filtering applied to luma components in HEVC Version 1 are applied to non-luma components).

In still another example, video encoder 20 and/or video decoder 30 may apply different thresholds, $\beta$ and $t_C$, for different color spaces. For example, according to aspects of this disclosure, thresholds may be established (e.g., according to a table of threshold values) that allows strong filtering to be applied to chroma components. In this example, video encoder 20 may set a flag to 1 to indicate that strong deblocking filtering is applied to chroma components according to the thresholds. In another example, the value of the flag may be inferred based on the color space (e.g., a 4:4:4 format indicates that strong deblocking filtering is applied to chroma components according to the thresholds, whereas a 4:2:2 format indicates that strong filtering is not enabled).

Figure 2:
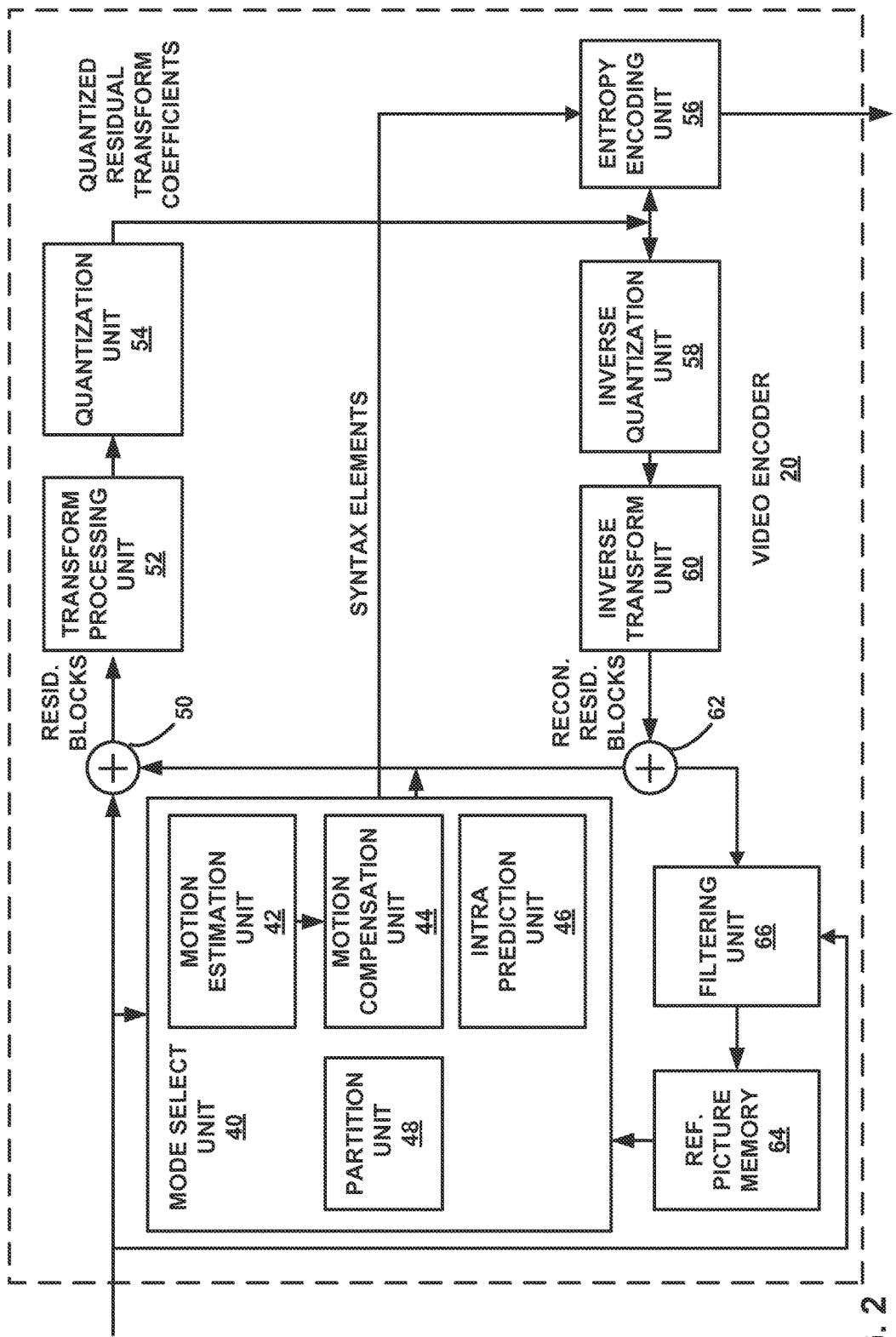
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, summer 62, and filtering unit 66.

During the encoding process, video encoder 20 receives a video picture or slice to be coded. Although not literally shown in FIG. 2, video encoder 20 may include a memory or other component to store incoming video data to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Filtering unit 66 may perform a variety of filtering processes. For example, filtering unit 66 may perform deblocking filtering. That is, filtering unit 66 may receive a plurality of reconstructed video blocks forming a slice or a frame of reconstructed video and filter block boundaries to remove blockiness artifacts from a slice or frame. In one example, filtering unit 66 evaluates the so-called "boundary strength" of a video block. Based on the boundary strength of a video block, edge pixels of a video block may be filtered with respect to edge pixels of an adjacent video block such that the transitions from one video block to another are more difficult for a viewer to perceive.

In some instances, the variables used by a deblocking filter may be derived from reconstructed video blocks without a comparison of reconstructed video blocks to the original source video blocks. Thus, video encoder 20 and video decoder 30 (FIG. 3) may each be programmed to perform the same deblocking process on reconstructed video blocks with minimal additional information regarding the original video frame coded into the bitstream. However, in some cases, filtering unit 66 may include syntax elements in the bitstream to indicate whether deblocking should be performed and/or whether one of a particular type of deblocking modes should be performed.

According to aspects of this disclosure, filtering unit 66 may implement a format-adaptive filtering scheme, as described above. For example, filtering unit 66 may apply deblocking filtering to chroma blocks of the reconstructed video based on the color space of the video data being coded. Thus, in some instances, filtering unit 66 may be enabled to apply strong deblocking filtering to chroma blocks of video data.

As noted above, filtering unit 66 (or another unit of video encoder 20, such as entropy encoding unit 56) may generate one or more syntax elements to indicate whether adaptive chroma deblocking filtering is being implemented. In other examples, filtering unit 66 may infer the appropriate chroma deblocking scheme based on the color space of the video data being encoded, thereby negating the need for such signaling.

Accordingly, video encoder 20 may perform any of the filtering techniques described in this disclosure. For example, video encoder 20 represents an example of a video encoder that may encode one or more syntax elements indicating whether a deblocking filtering process is applied to only a luma component of reconstructed video data, or is applied to at least one other video component of the video data in addition to the luma component of the video data, and deblock the video data based on the one or more syntax elements.

Figure 3:
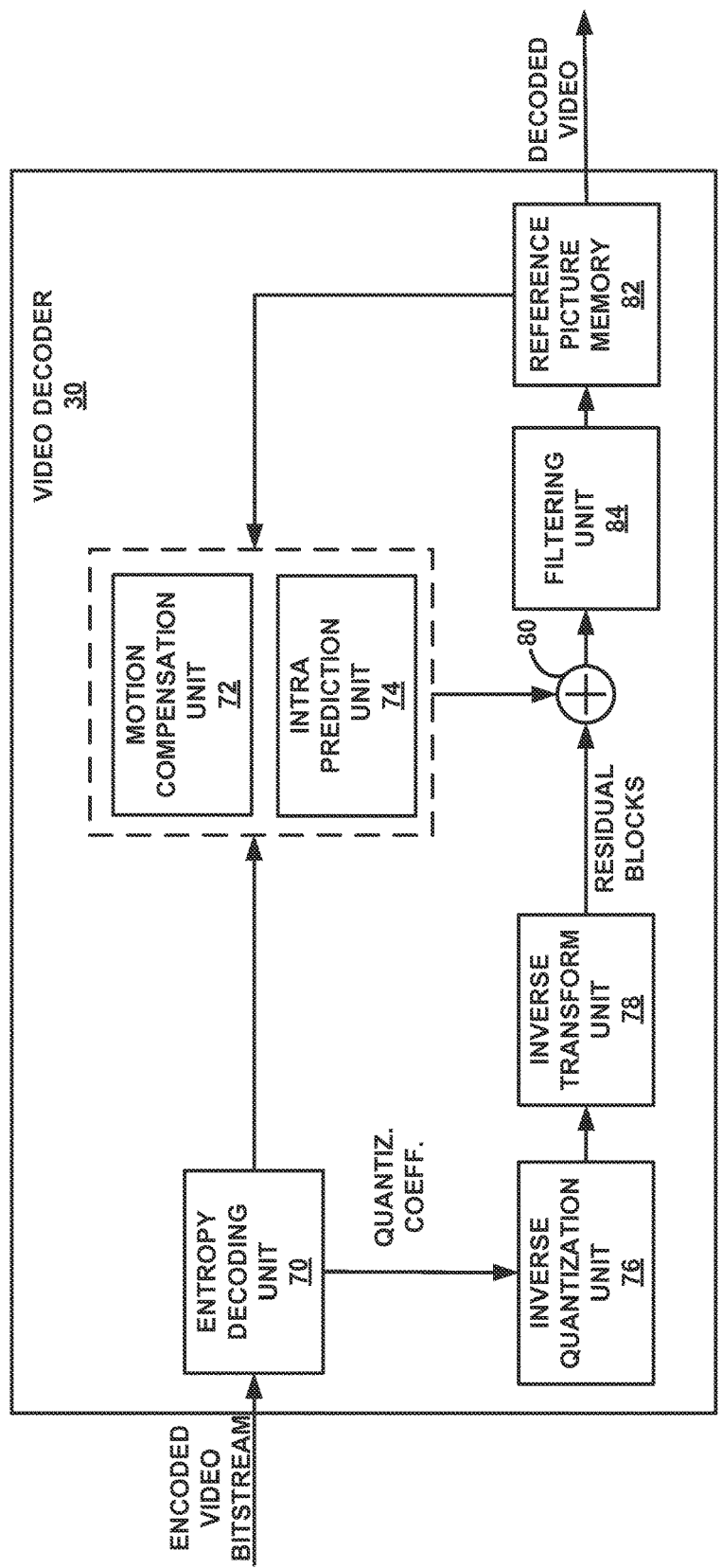
FIG. 3 is a block diagram illustrating an example video decoder that may implement the techniques of this disclosure.

FIG. 3 is a block diagram illustrating an example of video decoder 30 that may implement techniques for transformation as described in this disclosure. Again, video decoder 30 will be described in the context of HEVC coding for purposes of illustration, but without limitation of this disclosure as to other coding standards.

In the example of FIG. 3, video decoder 30 includes an entropy decoding unit 70, motion compensation unit 72, intra prediction unit 74, inverse quantization unit 76, inverse transformation unit 78, reference picture memory 82, summer 80, and filtering unit 84.

During the decoding process, video decoder 30 receives an encoded video bitstream that represents video blocks of an encoded video slice and associated syntax elements from video encoder 20. Although not literally shown in FIG. 3, video decoder 20 may include a memory or other component to store incoming video data to be decoded. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra-prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform unit 78 with the corresponding predictive blocks generated by motion compensation unit 72. Summer 80 represents the component or components that perform this summation operation.

Filtering unit 84 may, in some examples, be configured similarly to filtering unit 66 of video encoder 20 (FIG. 2). For example, filtering unit 84 may be configured to perform deblocking, SAO, or other filtering operations when decoding and reconstructing video data from an encoded bitstream.

According to aspects of this disclosure, filtering unit 84 may implement a format-adaptive filtering scheme, as described above. For example, filtering unit 84 may apply deblocking filtering to chroma blocks such that the deblocking filtering process varies based on the color space of the video data being coded. Thus, in some instances, filtering unit 84 may be enabled to apply strong deblocking filtering to chroma blocks of video data.

As noted above, filtering unit 84 (or another unit of video decoder 30, such as entropy decoding unit 70) may determine whether adaptive chroma deblocking filtering is to be used on the reconstructed video based on one or more parsed and decoded syntax elements included in a bitstream. In other examples, filtering unit 84 may infer the appropriate chroma deblocking scheme based on the color space of the video data being decoded, thereby negating the need for such signaling.

Accordingly, video decoder 30 may perform any of the filtering techniques in this disclosure. For example, video decoder 30 of FIG. 3 represents an example of a video decoder that may decode one or more syntax elements indicating whether a deblocking filtering process is applied to only a luma component of video data, or is applied to at least one other video component of the video data in addition to the luma component of the video data, and deblock the video data based on the one or more syntax elements.

Figure 4A:
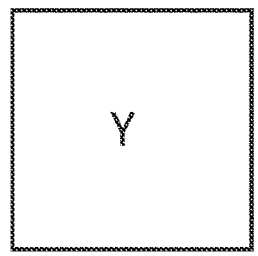
FIGS. 4A-4C are conceptual diagrams illustrating different sample formats for video data.
Figure 4A:
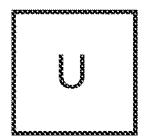
Figure 4A:
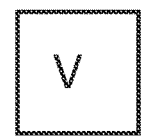
Figure 4B:
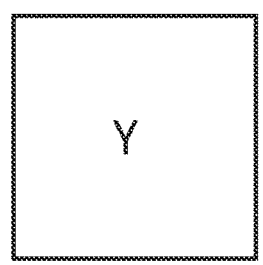
Figure 4B:
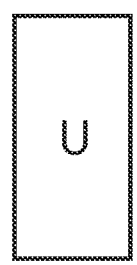
Figure 4B:
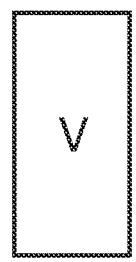
Figure 4C:
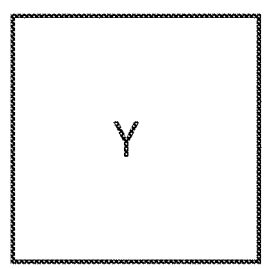
Figure 4C:
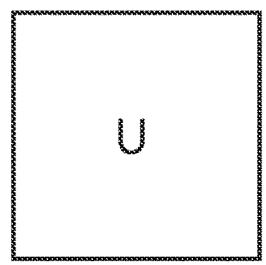
Figure 4C:
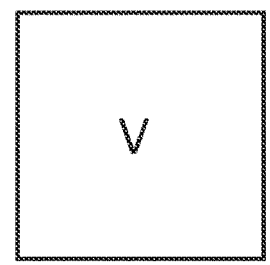

FIGS. 4A-4C are conceptual diagrams illustrating different color sampling formats for video data. For example, a video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the H.264/AVC standard and the first version of the HEVC standard (referred to as HEVC Version 1), a value called chroma_format_idc is defined to indicate different sampling formats of the chroma components, relative to the luma component. Table 1 illustrates the relationship between values of chroma_format_idc and associated chroma formats.

TABLE 1 different chroma formats defined in H.264/AVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component of the video data. In the chroma formats described in Table 1, the two chroma components have the same sampling rate.

In the example of Table 1, for the 4:2:0 format, the sampling rate for the luma component is twice that of the chroma components of the video data for both the horizontal and vertical directions. As a result, for a coding unit formatted according to the 4:2:0 format, the width and height of an array of samples for the luma component are twice that of each array of samples for the chroma components of the video data. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component of the video data. For a coding unit formatted according to the 4:4:4 format, an array of samples for the luma component has the same width and height as an array of samples for each chroma component of the video data.

It should be noted that in addition to the YUV color space, video data can be defined according to an RGB color space. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components, i.e., equal for Y, U and V or equal for R, G and B.

FIG. 4A is a conceptual diagram illustrating the 4:2:0 sample format. As illustrated in FIG. 4A, for the 4:2:0 sample format, the chroma components are one quarter of the size of the luma component of the video data. Thus, for a CU formatted according to the 4:2:0 sample format, there are four luma samples for every sample of a chroma component of the video data.

FIG. 4B is a conceptual diagram illustrating the 4:2:2 sample format. As illustrated in FIG. 4B, for the 4:2:2 sample format, the chroma components are one-half of the size of the luma component of the video data. Thus, for a CU formatted according to the 4:2:2 sample format, there are two luma samples for every sample of a chroma component of the video data.

FIG. 4C is a conceptual diagram illustrating the 4:4:4 sample format. As illustrated in FIG. 4C, for the 4:4:4 sample format, the chroma components are the same size of the luma component of the video data. Thus, for a CU formatted according to the 4:4:4 sample format, there is one luma sample for every sample of a chroma component of the video data.

Figure 5:
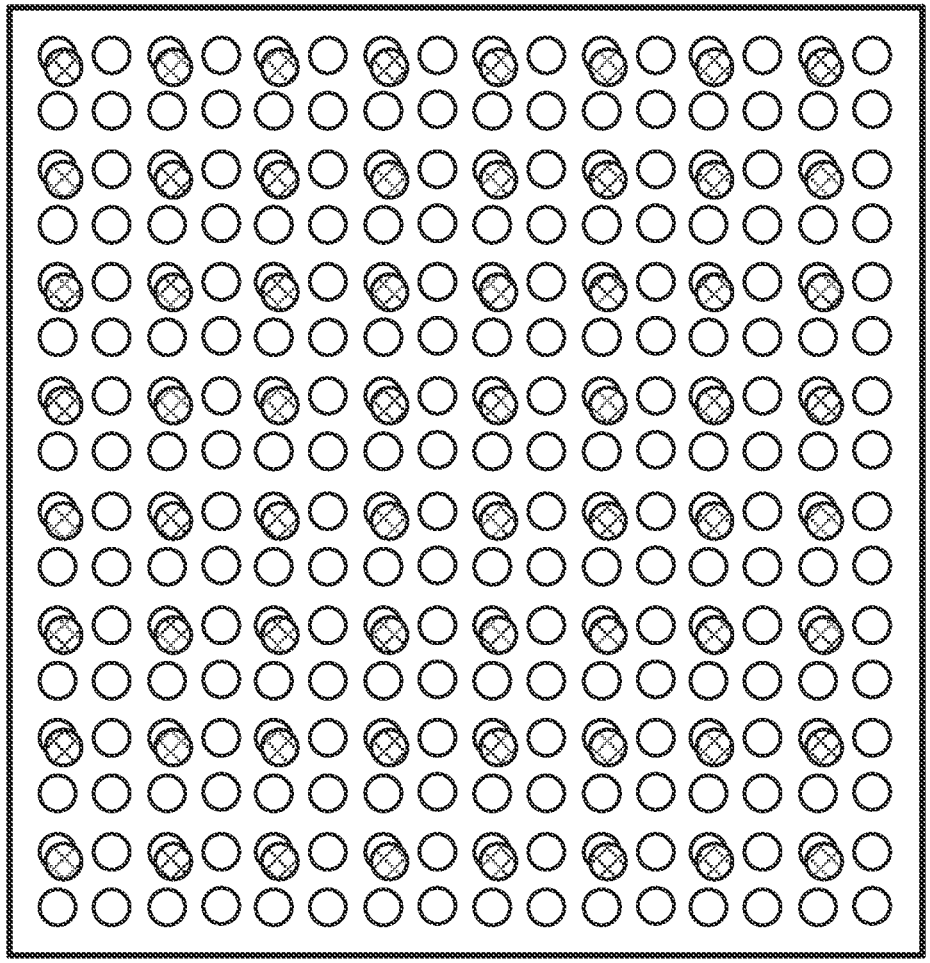
FIG. 5 is a conceptual diagram illustrating a 16×16 coding unit formatted according to a 4:2:0 sample format.

FIG. 5 is a conceptual diagram illustrating an example of a 16×16 coding unit formatted according to a 4:2:0 sample format. FIG. 5 illustrates the relative position of chroma samples with respect to luma samples within a CU. As described above, a CU is typically defined according to the number of horizontal and vertical luma samples. Thus, as illustrated in FIG. 5, a 16×16 CU formatted according to the 4:2:0 sample format includes 16×16 samples of luma components and 8×8 samples for each chroma component of the video data. Further, as described above, a CU may be partitioned into smaller CUs. For example, the CU illustrated in FIG. 5 may be partitioned into four 8×8 CUs, where each 8×8 CU includes 8×8 samples for the luma component and 4×4 samples for each chroma component.

Figure 6:
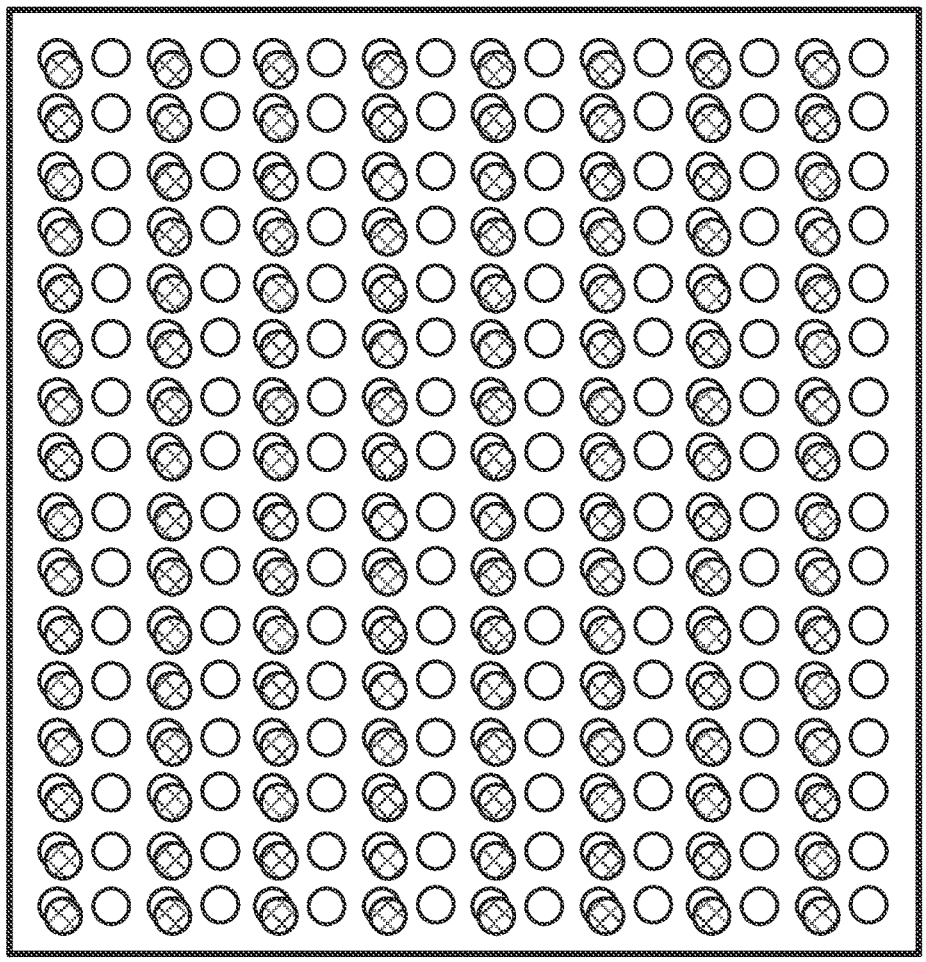
FIG. 6 is a conceptual diagram illustrating a 16×16 coding unit formatted according to a 4:2:2 sample format.

FIG. 6 is a conceptual diagram illustrating an example of a 16×16 coding unit formatted according to a 4:2:2 sample format. FIG. 6 illustrates the relative positions of chroma samples with respect to luma samples within a CU. As described above, a CU is typically defined according to the number of horizontal and vertical luma samples. Thus, as illustrated in FIG. 6, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 6 may be partitioned into four 8×8 CUs, where each CU includes 8×8 samples for the luma component and 4×8 samples for each chroma component.

Figure 7:
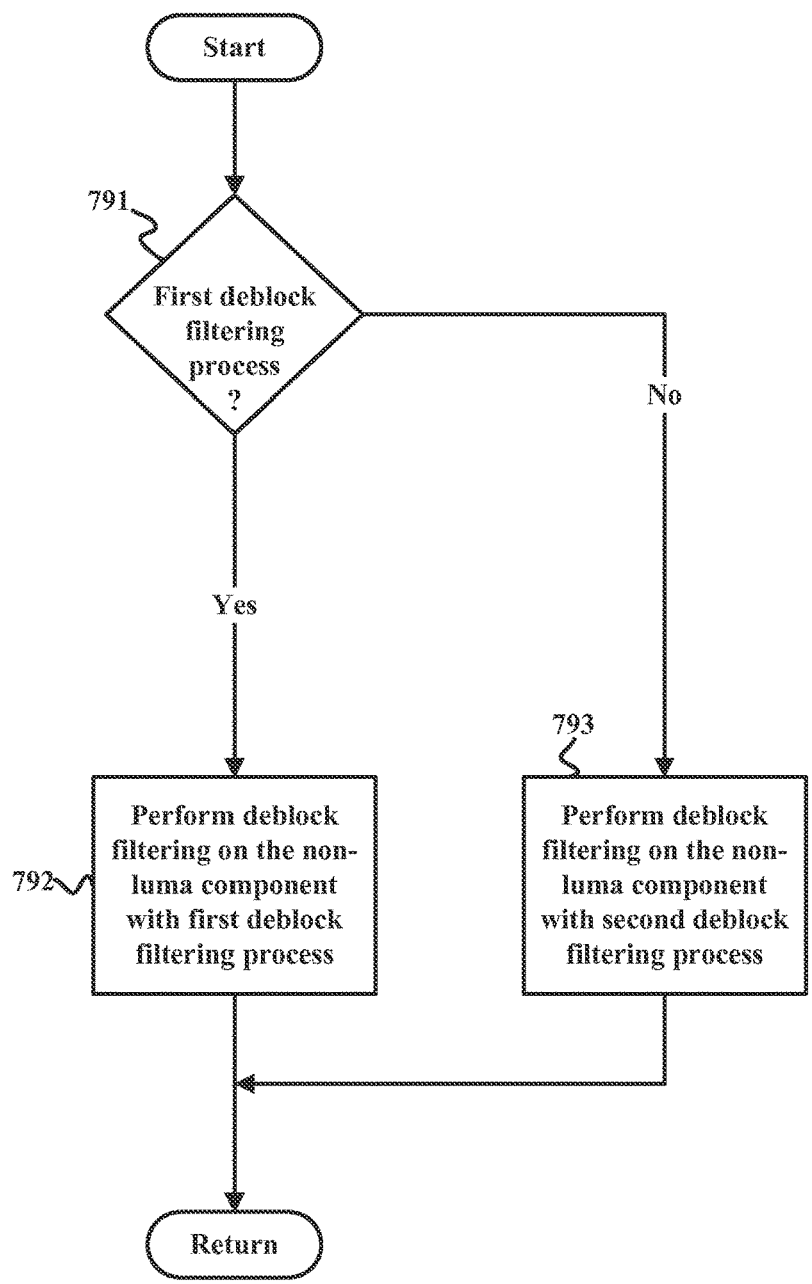
FIG. 7 is a flow diagram illustrating a process for deblocking video data in accordance with the techniques of this disclosure.

FIG. 7 is a flow diagram illustrating an example process for filtering video data, according to the techniques of this disclosure. The example of FIG. 7 may be performed by video encoder 20, video decoder 30, or a variety of other processors.

After a start block, the process proceeds to decision block 791, where, for a non-luma component of video data, a determination is made as to whether to perform deblock filtering based on a first deblock filtering process or a second deblock filtering process, where the first and second deblock filtering processes are different from one another. Some example differences between the first and second deblock filtering processes are discussed below.

If, at decision block 791, the determination is that deblock filtering should be performed based on the first deblock filtering process, the process moves to block 792, where deblock filtering on the non-luma color component is performed in accordance with the first deblock filtering process. The process then advances to a return block, where other processing is resumed.

If, at decision block 791, the determination is that deblock filtering should be performed based on the second deblock filtering process, the process moves to block 793, where deblock filtering on the non-luma color component is performed in accordance with the second deblock filtering process. The process then advances to a return block, where other processing is resumed.

Although the disclosure is not so limited, in some examples, the first deblock filtering process provides a first level of deblock filtering and a second level of deblock filtering, where the first level of deblock filtering is relatively stronger than the second level of deblock filtering, and where the second deblock filtering process provides exactly one level of deblock filtering. For example, the first deblock filtering process may allow both strong deblock filtering and weak deblock filtering, while the second deblock filtering process allows only weak deblock filtering. Additionally, in various examples, the exactly one level of deblock filtering used by the second deblock filtering process may be the same or different than either level of filtering used in the first deblock filtering process.

For example, in some examples, the first deblock filtering process may allow both strong deblock filtering and weak deblocking filter, in the same way as for luma components in the HEVC Version 1 specification, so that, on a block-by-block basis, for each block it may be determined to apply strong filtering, weak filtering, or no filtering. The determination of whether to apply strong filtering, weak filtering, or no filtering may be made, for example, based on the boundary strength of the video block. In this first deblock filtering process, for a boundary strength below a threshold value, no filtering is applies. For a boundary strength above the threshold value, weak or strong filtering is applied. Whether to apply weak or strong filtering may be based on multiple factors, including the boundary strength, where a greater boundary strength is a factor in favor of applying strong filtering, and a lower boundary strength is a factor in favor of applying weak filtering. This first deblock filtering process may be applied individually to each of the components of a video block.

In some examples, the second deblock filtering process may allow weak filtering only (i.e., rather than permitting weak or strong filtering on a selective basis in the first deblock filtering process), in the same way as for chroma components in the HEVC Version 1 specification, so that, on a block-by-block basis, for each block it may be determined to apply weak filtering or no filtering. In this example, strong filtering is not permitted and therefore is not possible with the second deblock filtering process.

Although the disclosure is not so limited, in some examples, the first deblock filtering process includes performing deblock filtering to both intra-predicted data and inter-predicted data, and the second deblock filtering process includes performing deblock filtering for intra-predicted data and performing no deblock filtering for inter-predicted data. Hence, in the first deblock filtering process, deblock filtering may be applied on a selective basis, e.g., based on boundary strength, to video blocks that are inter-coded or intra-coded. For the second deblock filtering process, deblock filtering is applied, but only for intra-coded video blocks, and not for inter-coded video blocks. In some examples, deblock filtering is performed on both a luma component of the video data and non-luma components of the video data. In these examples, deblocking filtering may be performed on the luma component of the video data based on a luma deblock filtering process. The first deblock filtering process includes one or more aspects of the luma deblock filtering process. In some examples, the first deblock filtering process is identical to the luma deblock filtering process. In other examples, the first filtering process includes one or more, but not all, of the aspects of the luma deblock filtering process. In some examples, strong filtering is enabled for the luma deblocking filtering process and not for the first deblock filtering process, but the first deblock filtering process is the same as the luma deblock filtering process except for the fact that strong filtering is not enabled for the first deblock filtering process.

In some examples, the determination at decision block 791 is made based on a syntax element that is encoded in the bitstream by video encoder 20. In some examples, the syntax element is a flag. In some examples, the syntax element is a flag that is encoded by encoder 20 in the sequence parameter set (SPS) of the video data, the picture parameter set (PPS) of the video data, or the slice header of the video data. In some examples, video encoder 20 and/or video decoder 30 receives the syntax element, e.g., in the SPS, PPS or slice header, and decodes the syntax element to make the determination of block 791. In some examples, the flag is a deblock_chroma_as_luma flag, and the determination is made to perform the first deblock filtering process if the flag has a true value, e.g., a value of 1, and to perform the second deblock filtering process if the flag has a false value, e.g., a value of 0. However, the disclosure is not so limited, and other examples may be employed for the syntax element.

In some examples, if the syntax element is received in the SPS, the selected deblock filtering process to all blocks in the sequence; likewise, the selected deblock filtering process is applied to all blocks in picture for case of signaling in PPS or all blocks in slice for case of signaling in slice header.

In some examples, the video data is in a YCbCr format, and the non-luma components are chroma components Cb and Cr. In other examples, the video data is in an RGB format, and all of the components are non-luma components. In some examples, the process of FIG. 7 may be employed separately for each non-luma component. For example, separate flags may be individually set for each of the non-luma components (e.g., Cb and Cr, which may be referred to as a first non-luma component and a second non-luma component) to indicate whether the first deblock filtering process or the second deblock filtering process is to be used for the respective non-luma component. In other examples, one determination is made that applies to all of the non-luma components in the video data. For example, in some examples, one flag is set that applies to all of the non-luma components in the video data. In particular, instead of signaling a separate flag for each non-luma component, video encoder 20 may make one determination that applies to all of the non-luma components, and generate a single flag that indicates the determination (e.g., whether to apply the first deblock filtering process or the second deblock filtering process) for the non-luma components.

In some examples, the determination at decision block 791 is made based on the energy level of the non-luma color components. For example, in some examples, determination at decision block 791 includes selecting the first deblock filtering process as the determined deblock filtering process for the non-luma component of the video data when the energy level of the non-luma color component of the video data is greater than an energy level threshold, and selecting the second deblock filtering process as the determined deblock filtering process for the non-luma component of the video data when the energy level of the non-luma color component of the video data is less than the energy level threshold.

It is generally preferable to avoid the use of a strong filtering of a video component when the energy level of the video component is relatively low. However, when the energy level of the video component is relatively high, applying only the weak filter and not using the strong filter when appropriate can hard the visual quality. For example, in the YCbCr 4:2:0 format, for the Cb and Cr components, it may be preferable to use the weak filter only for Cb and Cr components because the chroma components have less energy compared to Y. However, applying only the weak filter for chroma can harm the visual quality for other color space or format such as YCbCr 4:4:4 as chroma components may have more energy than in YCbCr 4:2:0 format. In some examples, the determination at 791 may be made simply based on the color space, based on expectation about the energy levels. In other examples, the energy levels may be actually measured, and the determination may be made to select the first deblock filtering process as the determined deblock filtering process for the non-luma component of the video data when the energy level of the non-luma color component of the video data is greater than an energy level threshold, and to select the second deblock filtering process as the determined deblock filtering process for the non-luma component of the video data when the energy level of the non-luma color component of the video data is less than the energy level threshold.

In some examples, the determination at decision block 791 is made based on the color space of the video data. For example, in some examples, at the determination at decision block 791, the first deblock filtering process is selected as the determined deblock filtering process if the color space of the video data is YCbCr 4:4:4 or RBG, and the second deblock filtering process is selected as the determined deblock filtering process if the color space of the video data is YCbCr 4:2:2: or YCbCr 4:2:0.

As another example, in some examples, at the determination at decision block 791, the first deblock filtering process is selected as the determined deblock filtering process for the non-luma color component if the sampling rate of each component of the video data is identical to the sampling rate of each other component of the video data. For example, the sampling rate of the chroma components are different than the luma components in YCbCr 4:2:2: or YCbCr 4:2:0 and the second deblock filtering process is employed if the video data is in one of these formats. Alternatively, the sampling rate is the same for all video components in YCbCr 4:4:4 or RBG, and the first deblock filtering process is employed if the video data is in one of these formats.

As discussed above, in various examples, various criteria may be used to determine selected the deblocking filtering process. In some examples, one of the above-discussed criteria or other suitable criteria may be employed, and in other examples, two or more criteria may be used, so that the above-discussed criteria are not necessarily mutually exclusive, in that more than one of the criteria may be employed to make the determination in some examples. Further, as discussed above, in some examples, the determination is made based on a flag, and signaled by the flag, and in other embodiments, the determination is made by the decoder on its own without signaling from the encoder.

As discussed above, in some examples, the process of FIG. 7 may be performed by video encoder 20, video decoder 30, or a variety of other processors. In some examples, the process may be performed by a device including a memory that is configured to store code, and at least one processor that is configured to execute code to enable the actions of the process. In some examples, the acts of the process may be encoded on a non-transitory processor-readable medium that is arranged to encode processor-readable code, which, when executed by one or more processors, enables actions of the process.

As discussed above, in some examples, the determination at decision block 791 is made by video encoder 20 and/or video decoder 30 based on a syntax element generated by video encoder 20. In some examples, the syntax element is generated by video encoder 20. In some examples, the syntax element may be coded to indicate the determined deblock filtering process for the first non-luma color component. For example, in some examples, during the encoding path but prior to deblocking, a determination may be made by video encoder 20, for one or more non-luma color components of the video data, whether to perform deblock filtering based on a first deblock filtering process or a second deblock filtering process. The determination may be based on the color space of the video data, user input, or other factors in various examples. A syntax element may then be encoded by video encoder 20 to indicate the determined deblock filtering process for one or more non-luma color components. In some examples, during deblocking, the process of FIG. 7 may be employed, and the determination at decision block 791 may be made based on this syntax element. In some examples, the syntax element is a deblock_chroma_as_luma flag that is stored in the sequence parameter set (SPS) of the video data, the picture parameter set (PPS) of the video data, or the slice header of the video data.

Examples of the process of FIG. 7 may be employed, for example, during the encoding path and/or decoding path of the video data. In some examples, the deblock filtering of the process of FIG. 7 may be employed as an in-loop filter during both the encoding path of video encoder 20 and the decoding path of video decoder 30. In examples, the deblock filtering may be performed at some other time, such as during post-processing. In some examples, the determined deblocking filtering process may be employed for each non-luma component of the video data. In other examples, separate determinations as to which deblocking filtering process to employ for the non-luma components may be made.

Figure 8:
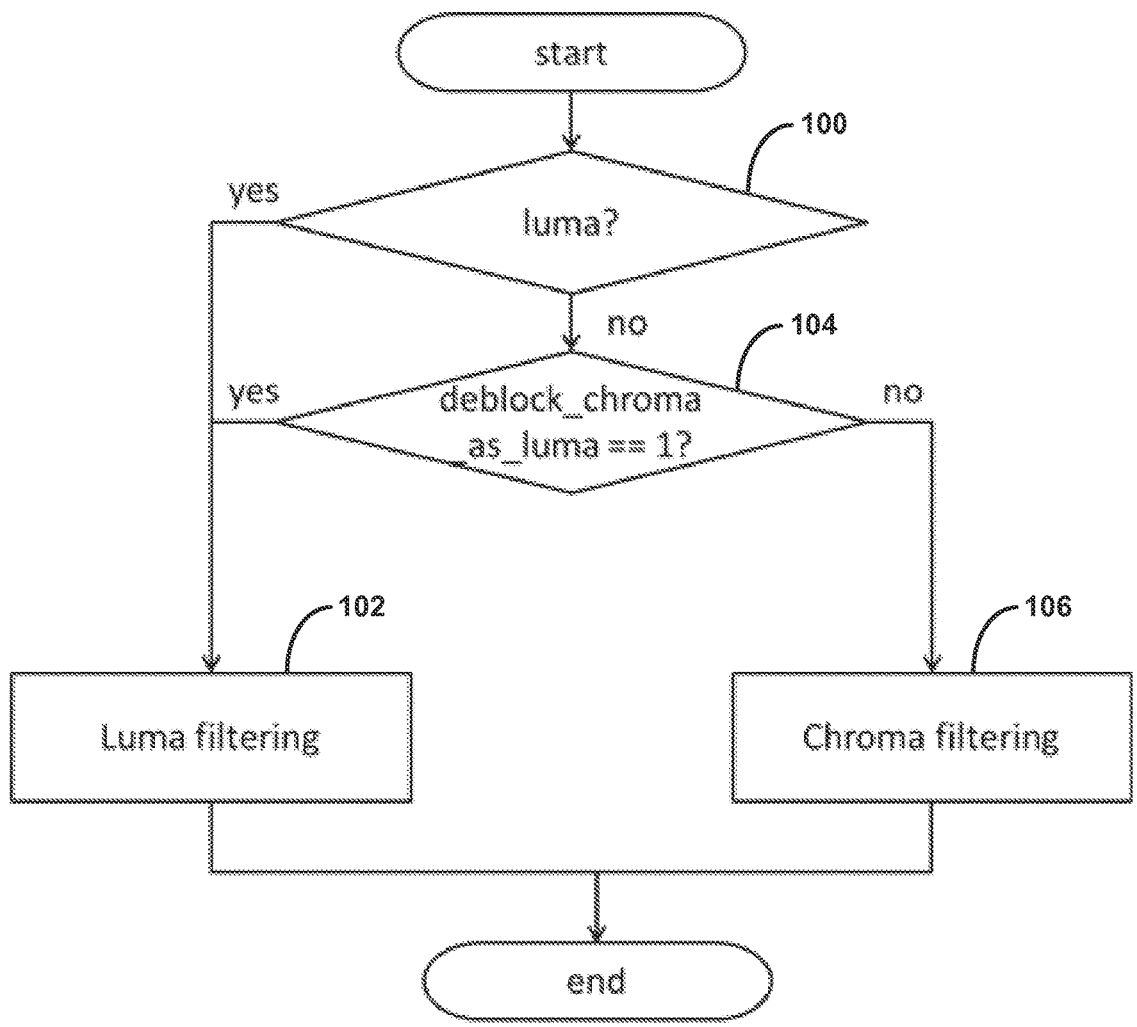
FIG. 8 is a flow diagram illustrating a process for coding video data in accordance with the techniques of this disclosure.

FIG. 8 is a flow diagram illustrating an example process for filtering video data in a video coding process, according to the techniques of this disclosure. The example of FIG. 8 may be performed by video encoder 20, video decoder 30, or a variety of other processors.

As noted above, according to aspects of this disclosure, video encoder 20 and/or video decoder 30 may apply the deblocking scheme for luma components to all video components, including chroma components or other color components (e.g., R, G, and B in case of RGB space). Thus, in some instances, video encoder 20 and/or video decoder 30 may apply strong filtering to chroma components or other color components. In some examples, such functionality may be signaled using one or more syntax elements (e.g., a deblock_chroma_as_luma flag).

In the example of FIG. 8, a video coder (such as video encoder 20 or video decoder 30) may determine whether a block currently being decoded is a luma block (100). If the luma video component is being coded, the video coder may apply a luma deblocking scheme to the block (102). For example, according to the HEVC standard, the video coder may apply a luma deblocking scheme in which a strong deblocking filter or a weak deblocking filter is applied to the block, based on, for example, edge or other characteristics of the block or surrounding blocks.

If the block currently being decoded is not a luma block (the "no" branch of step 100), the video coder may determine whether adaptive deblocking filtering is enabled. For example, the video coder may determine whether a deblock_chroma_as_luma flag has been set to 0 or 1 (104). If the flag is set to 1, the video coder may apply the luma deblocking scheme to the block (e.g., either a strong or weak deblocking filter based on one or more criteria) (102). If the flag is set to zero, the video coder may perform normal chroma deblocking (e.g., weak deblocking only) (106).

In some examples, the flag described above may be set differently for different color spaces. For example, video encoder 20 may set the flag to 1 for RGB sequences and for YCbCr 4:4:4 sequences, pictures or slices, as applicable, and set the flag to 0 for YCbCr 4:2:2 and 4:2:0 sequences, pictures or slices. In another example, video encoder 20 may set the flag to 0 for either or both of such sequences.

Figure 9:
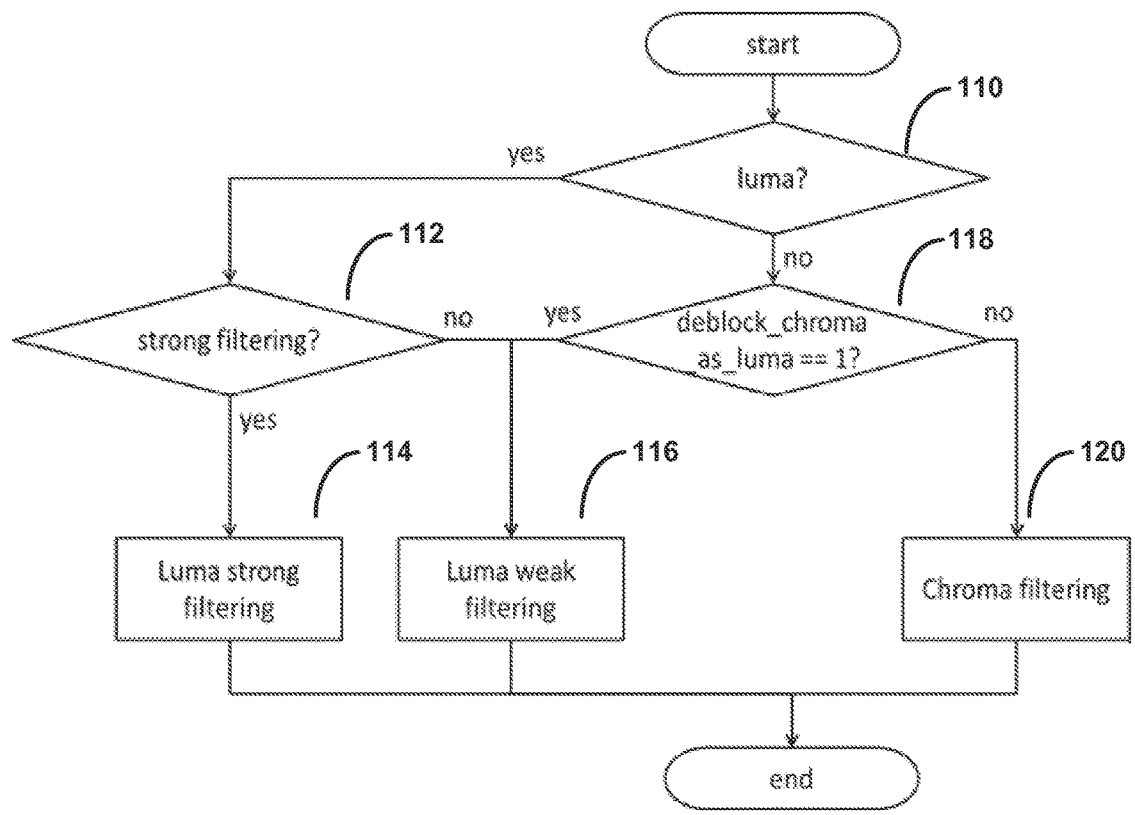
FIG. 9 is a flow diagram illustrating another process for coding video data in accordance with the techniques of this disclosure.

FIG. 9 is a flow diagram illustrating an example process for filtering video data in a video coding process, according to the techniques of this disclosure. The example of FIG. 9 may be performed by video encoder 20, video decoder 30, or a variety of other processors.

As noted above, in some instances, a video coder (such as video encoder 20 or video decoder 30) may perform luma-type deblocking on non-luma, e.g., chroma, components, but may refrain from applying strong filtering to the chroma components. That is, the video coder applies weak deblock filtering or no deblock filtering to the non-luma blocks, and does not apply strong deblock filtering to the non-luma blocks. In such instances, the video coder may apply deblocking to both inter- and intra-coded chroma components. For example, in HEVC Version 1, deblocking filtering for chroma components may be prediction dependent, such that deblocking filtering may only be performed on chroma components when one or both blocks forming the boundary being deblocked have been coded using an intra-prediction mode.

According to aspects of this disclosure, in some instances, this deblocking prediction restriction for chroma components may be removed (i.e., the restriction that deblocking filtering may only be performed on chroma components when one or both blocks forming the boundary being deblocked have been coded using an intra-prediction mode may be removed). For example, deblocking filtering may be performed on chroma components when one or both blocks forming a boundary are coded using an inter-prediction mode. However, applying a strong deblocking filter may require more implementation resources, because the strong filter typically requires storing more lines of pixels due to a longer filter tap size. Therefore, to reduce implementation complexity, according to some examples, the video coder may refrain from performing the strong deblocking filtering on the chroma components. In other examples, however, video encoder 20 and/or video decoder 30 may perform the strong deblocking filtering for both luma and chroma components.

In the example of FIG. 9, the video coder may determine whether the block currently being coded is a luma block (110). If the block is a luma component of video data, the video coder may apply a luma filtering process and determine whether to apply strong deblocking filtering (112). The video coder may then apply a strong deblocking filtering (114) or weak deblocking filtering (116) based on the determination.

If the block currently being decoded is not a luma block (the "no" branch of step 110), the video coder may determine whether adaptive deblocking filtering is enabled. For example, the video coder may determine whether a deblock_chroma_as_luma flag received in an encoded bitstream (e.g., in a SPS, PPS or slice header) has been set to 0 or 1 (118). If the flag is set to 1, the video coder may apply the weak luma deblocking scheme to the block (116), regardless of whether the block is intra- or inter-predicted. If the flag is set to zero, the video coder may perform normal chroma deblocking (e.g., only applying deblocking filtering to intra-predicted blocks) (120).

FIG. 10 is a flow diagram that illustrates how the boundary strength may be calculated in compliance with HEVC, consistent with the techniques of this disclosure. In some examples, as noted above, boundary strength calculations may be considered when determining whether to apply deblocking filtering and/or whether to apply strong or weak deblocking filtering. Moreover, consistent with this disclosure, filtering may be applied for inter-coded chroma blocks when boundary strength is greater than zero.

In one example, as shown in FIG. 10, "p" refers to a 4×4 part on the left or above edge of a block, and "q" refers to a 4×4 part on the right or bottom edge of a block. Filtering unit 66 of encoder 20 (FIG. 2) or filtering unit 84 of decoder 30 (FIG. 3) may determine whether p or q is in an intra CU (901). If so (yes branch of 901), the boundary strength is set to 2 (902). Accordingly, in some examples, filtering unit 66 and/or filtering unit 84 may apply deblocking filtering to chroma components of the block.

If not (no branch of 901), filtering unit 66 or 84 may consider whether the data corresponds to a TU edge and whether p or q is in a TU with a non-zero transform coefficient level (903). If the data corresponds to a TU edge and p or q is in a TU with a non-zero transform coefficient level (yes branch of 903), then the boundary strength may be set to 1 (904). If not (no branch of 903), then filtering unit 66 or 84 may consider:

whether p or q have different reference pictures or different numbers of motion vectors; OR whether p and q have one motion vector each and $|MVp_x-MVq_x|\geq 1$ or $|MVp_y-MVq_y|\geq 1$; OR whether p and q have 2 motion vectors each, and at least one motion vector pair satisfies $|MVp_x-MVq_x|\geq 1$ or $|MVp_y-MVq_y|\geq 1$ (905).

If the answer to decision box (905) is yes, then boundary strength may be set to 1 (904) and if the answer to decision box (905) is no, then boundary strength may be set to 0 (906).

Again, such boundary strength calculations may control the manner in which filtering unit 66 and/or filtering unit 84 apply deblocking filtering, including deblocking filtering to chroma components of video data. For example, filtering unit 66 and/or filtering unit 84 may apply deblocking filtering any time the boundary strength calculations are greater than zero (as in steps 902 and 904).

With HEVC Version 1, for non-luma components, no filtering is applied with Bs<2, and weak filtering is applied with Bs>1. With HEVC Version 1, for luma components, no filtering is applied with Bs=0, and weak or strong filtering is applied with Bs>0, where boundary strength may be a factor used in determining whether to apply weak or strong filtering. In accordance with this disclosure, when the flag is set to 0, all components may be filtering in accordance with HEVC Version 1. In accordance with the disclosure, in some examples, when the flag is set to zero, all components, including luma and non-luma components, may be filtered as luma components in HEVC Version 1. That is, in these examples, when the flag is set to 1, for both luma and non-luma components, no filtering is applied with Bs=0, and weak or strong filtering is applied with Bs>0, where boundary strength may be a factor used in determining whether to apply weak or strong filtering.

Certain aspects of this disclosure have been described with respect to the developing HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which does not include propagating signal per se or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or the like, but are instead directed to tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method for performing deblock filtering on video data, the method comprising:
receiving the video data in YCbCr format wherein at least one chroma component of the video data is Cb or Cr, and wherein each component of the YCbCr format has a sampling rate;
determining, for a chroma component of the video data and based on the sampling rate of the chroma component whether to perform deblock filtering based on a first deblock filter or a second deblock filter for the chroma component of the video data, the first deblock filter being relatively stronger than the second deblock filter;
based on the sampling rate of each component of a first block of the video data being identical to the sampling rate of each other component of the first block of the video data, selecting the first deblock filter;
performing deblock filtering on a first chroma component of the first block of the video data in accordance with the selected deblock filter for the first block of the video data by applying the first deblock filter;
based on the sampling rate of each component of a second block of the video data not being identical to the sampling rate of each other component of the second block of the video data, selecting the second deblock filter; and
performing deblock filtering on a second chroma component of the second block of the video data in accordance with the selected deblock filter for the second block of the video data by applying the second deblock filter.

2. The method of claim 1, wherein:
the first deblock filter has a longer filter tap size than the second deblock filter.

3. The method of claim 1, wherein determining includes determining, further based on an energy level associated with the chroma component, whether to perform deblock filtering based on the first deblock filter or the second deblock filter.

4. The method of claim 1, further comprising determining deblocking thresholds $\beta$ and $t_C$ for controlling deblocking strength based on the determined deblock filter.

5. The method of claim 1, further comprising:
performing deblock filtering on a second chroma component of the first block of the video data in accordance with the determined deblock filter for the first chroma component of the first block of the video data.

6. The method of claim 1, further comprising:
selecting, for a second chroma component of the first block of the video data, the first deblock filter; and
performing deblock filtering on the second chroma component of the first block of the video data in accordance with the selected deblock filter for the second chroma component of the first block of the video.

7. The method of claim 1, further comprising encoding the video data, wherein performing deblock filtering provides in-loop filtering during an encoding path.

8. The method of claim 1, further comprising decoding the video data, wherein performing deblock filtering provides in-loop filtering during a decoding path.

9. The method of claim 1, wherein determining includes determining, further based on a color space of the video data, whether to perform deblock filtering based on the first deblock filter or the second deblock filter.

10. The method of claim 9, wherein selecting the first deblock filter includes selecting the first deblock filter for the first chroma component of the first block of the video data when the color space of the video data is YCbCr 4:4:4.

11. The method of claim 1, wherein:
the first deblock filter is a deblock filter for both intra-predicted data and inter-predicted data, and the second deblock filter is a deblock filter for intra-predicted data and not a deblock filter for inter-predicted data.

12. The method of claim 1, further comprising:
performing deblock filtering on a luma component of the first block of the video data based on a luma deblock filter, and wherein the first deblock filter includes one or more aspects of the luma deblock filter.

13. The method of claim 12, wherein the luma deblock filter is identical to the first deblock filter.

14. An apparatus for performing deblock filtering on video data, comprising:
a memory that is configured to store the video data; and
at least one processor that is configured to:
receive the video data in YCbCr format, wherein at least one chroma component of the video data is Cb or Cr, and wherein each component of the YCbCr format has a sampling rate;
determine, for a chroma component of the video data and based on the sampling rate of the chroma component, whether to perform deblock filtering based on a first deblock filter or a second deblock filter for the chroma component of the video data, the first deblock filter being relatively stronger than the second deblock filter;
based on the sampling rate of each component of a first block of the video data being identical to the sampling rate of each other component of the first block of the video data, select the first deblock filter as a determined deblock filter;
based on the sampling rate of each component of the first block of the video data not being identical to the sampling rate of each other component of the first block of the video data, select the second deblock filter as the determined deblock filter; and
perform deblock filtering on a first chroma component of the first block of the video data in accordance with the determined deblock filter.

15. The apparatus of claim 14, wherein the at least one processor is further configured such that:
the first deblock filter has a longer filter tap size than the second deblock filter.

16. The apparatus of claim 14, wherein to determine whether to perform deblock filtering based on a first deblock filter or a second deblock filter, the at least one processor is further configured to determine, further based on the color space of the video data whether to perform deblock filtering based on a first deblock filter or a second deblock filter.

17. The apparatus of claim 14, wherein the at least one processor is further configured such that:
the first deblock filter includes deblock filtering of both intra-predicted data and inter-predicted data, and the second deblock filter includes deblock filtering of intra-predicted data and no deblock filtering of inter-predicted data.

18. The apparatus of claim 14, wherein the at least one processor is further configured to:
encode the video data, and the at least one processor is further configured such that performing deblock filtering provides in-loop filtering during an encoding path.

19. The apparatus of claim 14, wherein the at least one processor is further configured to:
decode the video data, and the at least one processor is further configured such that performing deblock filtering provides in-loop filtering during a decoding path.

20. A non-transitory processor-readable medium that stores instructions, which, when executed, configure one or more processors to:
receive video data in YCbCr format, wherein a first chroma component of the video data is Cb or Cr, and wherein each component of the YCbCr format has a sampling rate;
determine, for the first chroma component of the video data and based on the sampling rate of the first chroma component, whether to perform deblock filtering based on a first deblock filter or a second deblock filter for the first chroma component of the video data, the first deblock filter being relatively stronger than the second deblock filter;
based on the sampling rate of each component of the video data being identical to the sampling rate of each other component of the video data, select the first deblock filter as a determined deblock filter;
based on the sampling rate of each component of the video data not being identical to the sampling rate of each other component of the video data, select the second deblock filter as the determined deblock filter; and
perform deblock filtering on the first chroma component of the video data in accordance with the determined deblock filter.

21. A method for deblock filtering on video data in YCbCr format, wherein at least one chroma component of the video data is Cb or Cr, and wherein each component of the YCbCr format has a sampling rate, the method comprising:
determining, for a chroma component of the video data and based on the sampling rate of the chroma component, whether to perform deblock filtering based on a first deblock filter or a second deblock filter, the first deblock filter being relatively stronger than the second deblock filter;
based on the sampling rate of each component of a first block of the video data being identical to the sampling rate of each other component of the first block of the video data, selecting the first deblock filter;
coding, for a first chroma component of the first block, a filter selection flag to indicate the selected deblock filter for the first chroma component;
based on the sampling rate of each component of a second block of the video data not being identical to the sampling rate of each other component of the second block of the video data, selecting the second deblock filter; and
coding, for a second chroma component of the second block, a second filter selection flag to indicate the selected deblock filter for the second chroma component.

22. The method of claim 21, further comprising:
encoding the video data.

23. The method of claim 21, wherein determining, for the chroma component, whether to perform deblock filtering based on the first deblock filter or the second deblock filter includes making the determination further based on a color space of the video data, and
wherein coding the filter selection flag includes coding a first value indicating employment of the first deblock filter for the chroma component of the video data when the color space of the video data is YCbCr 4:4:4, coding a second value indicating employment of the second deblock filter for the chroma component of the video data when the color space is YCbCr 4:2:2, or coding the second value indicating employment of the second deblock filter for the chroma component of the video data when the color space is YCbCr 4:2:0.

\* \* \* \* \*